No. 852,129. PATENTED APR. 30, 1907.
G. A. MACBETH.
METHOD OF FORMING APERTURES IN GLASS.
APPLICATION FILED FEB. 11, 1907.

WITNESSES
Harvey L. Lechner
A. E. Gaither

INVENTOR
George A. Macbeth
by atty
Paul Synnestvedt

UNITED STATES PATENT OFFICE.

GEORGE A. MACBETH, OF PITTSBURG, PENNSYLVANIA.

METHOD OF FORMING APERTURES IN GLASS.

No. 852,129.            Specification of Letters Patent.            Patented April 30, 1907.

Application filed February 11, 1907. Serial No. 356,728.

*To all whom it may concern:*

Be it known that I, GEORGE A. MACBETH, a citizen of the United States, residing at Pittsburg, in the county of Allegheny and State of Pennsylvania, have invented a certain new and useful Method of Forming Apertures in Glass, of which the following is a specification.

My invention has particular reference to the formation of apertures in glass articles where it is of importance that such apertures be of certain specific and accurate sizes, and also accurately located with reference to the other parts of the article in which such apertures are formed, as for example in the construction of glass supporting bases and boxes of various kinds for the support of electrical apparatus where the glass is used as an insulator in place of a more common construction formed of porcelain. Another line of devices in which my invention is applicable is the class of lubricators employing glass cups or reservoirs which must be provided with apertures, especially in the base, and are accurately made and faced so as to fit upon gaskets or be held in other relations where accuracy and tightness is a prime requisite.

On account of the degree of accuracy generally required in work of this character it has not heretofore been practicable to form the apertures referred to in the usual manipulation of the plastic glass, as it is apparent that the molds or other apparatus employed in forming the glass must be withdrawn before the glass has shrunk or set, and then there is a flow of the material which destroys the accuracy of the work. There are other reasons why desired results cannot be obtained by molding of the glass alone, and therefore it has been heretofore generally customary to construct such apertures by drilling alone, or by formation in the way of molding and then a breakage of the molded part and a subsequent grinding of the surface. Both of the methods referred to are expensive and also involve considerable loss because of the uncertain effects produced in the breakage which make it necessary to throw away a good many of the devices, and also because of the difficulty of holding the articles in proper position during the grinding, so as to get an accurate grinding effect. To overcome the objections referred to in the formation of apertures in glass articles of this general character is the main object accomplished by my improved process which will be now better understood by the description which I will now give in connection with the drawing herewith, in which—

Figure 4:
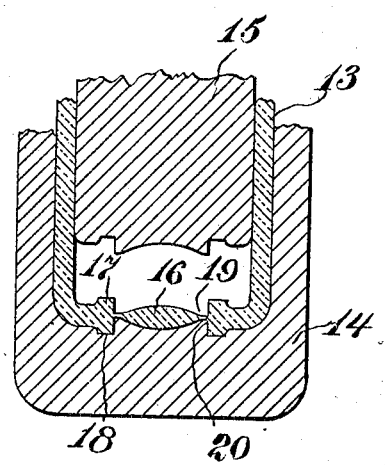
Figure 5:
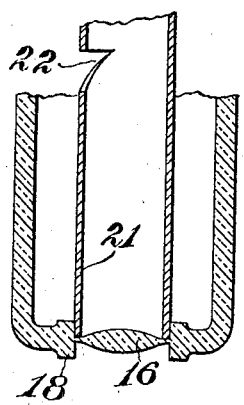
Figure 6:
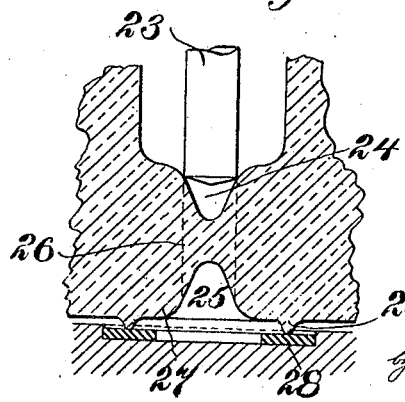

Figure 4 indicates the formation of the glass article according to the first step of my improved process, and Figure 5 what I will call the second step of the process, while Figure 6 indicates a further development or application of my invention in connection with a thicker glass wall and a smaller diameter of aperture.

Figure 1:
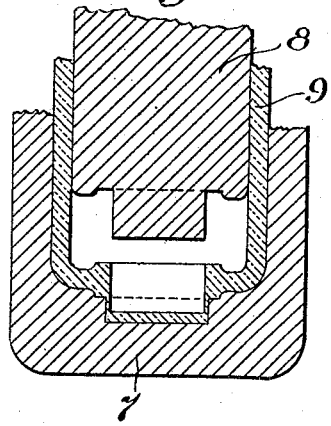
Figure 1 represents more or less diagrammatically the formation of a glass cup or piece such as may be used in small-sized lubricator mechanism in a mold, such as is usually employed in forming pressed glassware of this character.
Figure 2:
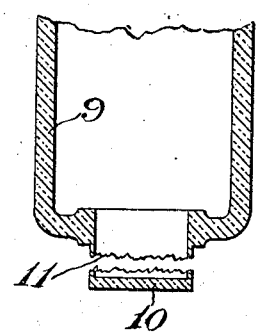
Figure 2 shows the second step in the operation as customarily followed, and Figure 3 the third step of the old method, that is, the grinding of the broken surface.
Figure 3:
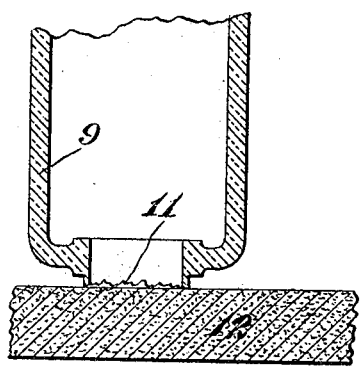

Referring now particularly to Figures 1, 2 and 3, it will be seen that in such three figures I have indicated in a general way the method commonly employed in doing work of this character. In Figure 1 there is a lower mold part 7, a plunger or upper mold part 8, and a glass article 9 being formed between the two, as clearly indicated; the plunger 8 being drawn upward after the formation of the plastic material into the article 9 as shown. In Figure 2 is indicated the manner in which the cup or glass article 9 is broken away so as to detach the bottom part 10, leaving a ragged or jagged edge 11 surrounding the aperture and projecting downward below the device or article 9, the pressing of the article having been of such a character as to leave the part 10 projecting downwardly or out of the plane of the base of the article so as to permit of such breakage as is indicated.

In Figure 3 the article 9 is shown as resting upon a grinding wheel 12 to grind down the jagged edge 11 to a smooth bearing surface as it is usually accomplished. It is evident from the above that Figures 1, 2 and 3 involve the three steps generally employed in making articles of this character, first the molding, second, breakage separating the detached parts, and third, the grinding to procure a smooth surface around the aperture.

In my improved process there are practically only two steps employed in place of the three just described which characterize the older art. The steps in question are illustrated in Figures 4 and 5 as applied in conjunction with the same kind of device, that is, a glass cup such as may be used for a lubricator for example, which I have here marked 13 and which is in the first place formed between two mold parts 14 and 15 which are constructed so as to form a separating wall 16 located between the surfaces 17 and 18 in the manner shown in Figure 4, that is, so as to have a depression 19 on the upper side, and a corresponding depression 20 in opposition thereto upon the lower side, such depressions being arranged to register with each other in the manner shown so as to permit the drilling out of the part 16 as indicated in Figure 5 by means of a drill mechanism as indicated at 21 which is an ordinary form of tubular copper drill in which within the space in the center may be introduced emery or other grinding material through the aperture 22, the said drill 21 serving to drill out the center part 16 as indicated clearly in Figure 5, and clearing the hole or aperture without drilling clear through to the lower edge 18, whereby is avoided the ragged or broken corner around the aperture such as is produced where straight drilling is used without such preliminary molding or pressing.

Referring to Figure 6, it will be seen that in forming small apertures I use a solid drill of some suitable construction such as is indicated at 23, the glass being first prepared for the action of the drill by forming the depression 24 above, and a registering or corresponding depression 25 below extending a considerable portion of the way through the glass wall and arranged so that the depression 24 will form a guide for the drill which will follow down along the path indicated by the dotted line 26 and come through into the depression 25 in a manner which will leave a clear smooth hole because of the inclination and curvature indicated at 27, which prevents the breaking and formation of a ragged edge where the drill goes through the glass.

It is evident that in both the method of procedure indicated in Figures 4 and 5 and in Figure 6 the drilling will be accomplished without the formation of any jagged or rough broken edges around the opening and with very much less of the material to be drilled than where drilling alone is used, which will very materially reduce the cost, and the formation of the depression forms a guiding means for the drill so that whereas in electrical apparatus a large number of openings have to be made in certain definite relation to each other the depressions will serve as a centering means so as to secure accuracy in the placement of the apertures. The formation of the oppositely disposed depressions will also secure accuracy in the alinement of the openings and smooth holes throughout; both where the drill enters and where it leaves the glass.

Another of the advantages incident to my improved process is that in work requiring a tight fit as upon a gasket joint such as is indicated at 28 in Figure 6, where a bead 29 is to be formed around an aperture to secure a tight seat upon the gasket, there will not be any chipping or cracking or breaking away of the glass at the lower end of the aperture adjacent the bead 29 such as will destroy the piece or cause leakage at the point indicated.

Having thus described my invention and illustrated its use, what I claim as new and desire to secure by Letters Patent, is the following:

1. The herein described method of making holes through glass which consists in pressing a depression in the hot plastic glass wall to be penetrated, and subsequently drilling out the remaining material from the side opposite the depression.

2. The herein described method of making holes through glass which consists in pressing opposing depressions in the hot plastic glass wall and subsequently drilling out the material between said depressions.

3. The herein described method of making holes through glass which consists in pressing opposing depressions with outer rounded edges in the hot plastic glass wall and subsequently drilling out the material between said depressions.

In testimony whereof I have hereunto signed my name in the presence of the two subscribed witnesses.

GEORGE A. MACBETH.

Witnesses:
PAUL SYNNESTVEDT,
F. E. GAITHER.